United States Patent Office 3,167,321
Patented Jan. 26, 1965

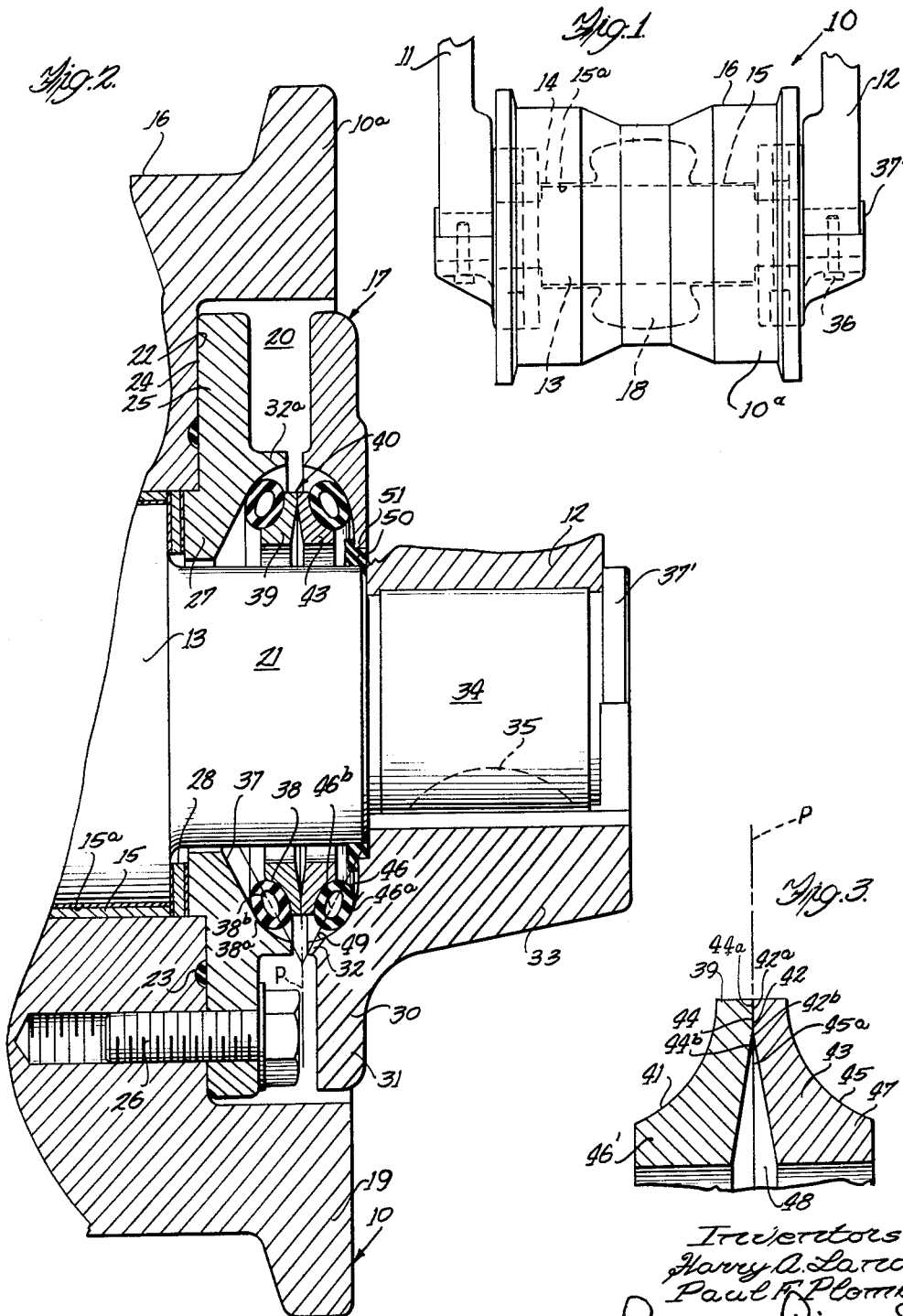

3,167,321
SEAL BETWEEN RELATIVELY ROTATING PARTS
Harry Albert Land, Algonquin, and Paul F. Plomb, Elmhurst, Ill., assignors to International Harvester Company, Chicago, Ill., a corporation of New Jersey
Filed May 21, 1962, Ser. No. 196,305
4 Claims. (Cl. 277—92)

This invention has to do with a seal structure for bearings between relatively rotating parts to exclude foreign matter from the bearings and to preclude the escape of lubricant therefrom.

A general object of this invention is the provision of an improved seal structure capable of adjusting to axial, lateral, and tilting movement of relatively rotating parts between which the structure is installed. Because of its adaptation to these adjustments, a seal embodying the invention is particularly useful between relatively rotating parts of the crawler tractor track-guide rollers and the final drive shafts of a crawler tractor and the like, which parts are subjected to severe irregular strains.

Another object of this invention is to provide a free-floating seal structure that has the contacting seal faces of its rotor and stator element subjected to an equal pressure for the entire 360° about such elements.

Still another object of this invention is to provide a close and intimate contact of the sealing faces of the rotor and stator sealing elements.

It is still another object of this invention to provide a tubular pressure ring about one of two relatively rotating members for holding the sealing faces of the members in smooth and intimate contact with one another.

Still another object of this invention is to provide a face sealing structure for relatively rotating parts and comprising resilient deformable sealing means urgingly pressed against the back faces of the sealing rings of extremely hard sealing faces lapped to light band specification wherein the resilient deformable sealing means apply equalized pressure along the entire extent of the sealing faces in order to provide a close and intimate seal.

A more specific object in line with the above objective relative to face sealing structure, is the provision of such structure between the relatively rotating parts comprising, in combination with those parts, a free-floating pair of symmetrical seal ring parts of hard material having relatively rotatable, radially extending end surfaces which engage in the plane of the surfaces in face seal contact with one another, and having concave backing faces; each of the relatively rotating parts having a concave face opposing a respective backing face of the seal ring parts and together presenting generally longitudinally acting, longitudinally opposing, concave pressure surfaces; and a pair of symmetrical, hollow, pressure O-rings of elastomeric material sealed between and compressed by the opposing concave pressure surfaces of said parts to float the pair of seal ring parts, said O-rings nesting in the concave backing faces and being compressed into an elliptical, hollow shape wherein, as viewed in cross section, the respective O-rings include major axes, which axes when extended intersecting approximately in the plane of said seal-ring-part surfaces at a point radially outwardly of said surfaces, and which axes at their intersection forming an acute, inwardly facing angle.

These and additional desirable objects inherent in and encompassed by the invention will be more readily comprehended after reading the following description with reference to the annexed drawings consisting of:

FIG. 1 which is a view illustrating a front elevational view of a track roller and employed in a tractor of a crawler type;

FIG. 2 which is a sectional view taken transversely through a track frame of a crawler tractor and actually through an end portion of the track roller, and a bearing constructed according to the principles of this invention; and FIG. 3 is an enlarged view of the sealing faces of the rigid sealing rings.

The present invention embodies certain improvements over the seal means disclosed in our copending application Serial No. 135,009, filed August 30, 1961. However, in describing the preferred embodiment of the invention illustrated in the drawings, specific terminology will be resorted to for the sake of clarity. However, it is not intended to be limited to specific terms so selected, and it is to be understood that each specific term includes all technical equivalents which operate in a similar manner to accomplish a similar purpose.

Turning now to the specific embodiment of the invention selected for illustration in the drawings, the present bearing seal is particularly well suited for use in conjunction with a bearing for a roller which carries the track of a crawler-type tractor, the drawings illustrating a typical installation of a track roller. This roller unit which is designated 10 is one of several which are similarly mounted and distributed lengthwise and between laterally spaced track frame members 11 and 12. Each roller unit 10 has a roller 10a which is carried upon a non-rotatable shaft 13 which has its opposed ends anchored in main frame members 11 and 12. Bearing units or bushings 14 and 15 are mounted on the inner periphery 15a of the track roller or rotor member 10a and bear against the track roller shaft or stator member 13. Each roller has a pair of circumferential grooves 16 for receiving and guiding the length of a track (not shown).

Identical seal structures are employed for the bearings 14 and 15 so it will suffice to refer solely to the seal structure illustrated in partial longitudinal section (FIG. 2) in conjunction with the bearing unit 15. One purpose of the bearing seal structure, which is generally designated 17, is to prevent the leakage of lubricating oil from the oil reservoir 18 in the shaft 13. If it were not for the seal structure, the lubricant within the area 18 would escape from the bushing 15 and the shaft 13. A further purpose of the structure is to prevent foreign matter from reaching the bearing unit 15.

The roller 10a at its end has an annular and radially and axially extending outer peripheral portion or flange 19 defining an annular recess 20 with the extension 21 of the shaft 13 in which is disposed the bearing seal structure 17. The roller 10a further has an outer facing radially extending wall portion 22 which is recessed to carry an O-ring 23. The wall portion 22 engages the face 24 of a retainer plate 25 which is an annular flange encircling the shaft extension 21, said flange being fastened against the face 22 by locking means 26 holding the O-ring 23 in place. The retainer plate 25 extends radially outwardly and has an inner boss portion 27 engaging thrust washer 28 about the shaft extension 21 and holds the thrust washer 28 against the radial side surfaces of the shaft 13 by the locking member 26. A track roller shaft flange or bracket 30 is spaced outwardly axially of the retainer plate 25 and comprises an elongated radially extending annular member about the shaft extension 21 and having radially extending hood 31 and axially extending hood 32, the hood members 31 and 32 acting as dust shields to minimize the amount of entrance of foreign particles in the recess 20 into which the shield elements 31 and 32 are located. The retainer element 25 has a hood projection 32a opposing the axially aligned hood member 32 for minimizing the entrance of foreign particles into the recess 20. The lower half of a track roller shaft bracket 30 carries an outwardly extending shaft support 33 which encompasses the lower half of a portion of the shaft extension 21 and also surrounds the lower half of outer axial end 34 of shaft 13 to which shaft portion 34 is keyed by key structure 35, the upper half of shaft portion 34 being encompassed by track frame member 12 which is locked by bolt 36 to the bracket extension 33, the upward radial projection 37' of the extension 34 acting somewhat as a guide against undue horizontal shift of the roller unit with respect to the track frame.

The retainer plate 25 has an outwardly directed radially and diagonally extending face 37 that is slightly concave at its ends, its outward radial portion merging with the hood portion 32a and has a portion of its periphery engaging with an elastomeric or resilient deformable pressure ring or tubular member 38 of the sealing unit 40, the member 38 having a tube 38a with an aperture 38b disposed in the annular recess 20 between the retainer plate 25 and the track roller shaft bracket 30. A sealing ring 39 of seal unit 40 is of extremely hard material and has radially and diagonally extending inwardly directed surface or backing face 41 engaging the other side of the pressure ring 38 of annular extent and in general axial alignment with the annular pressure ring 38. The sealing ring 39 also has an outwardly directed sealing face 42 in a generally radial reference plane P with respect to the axis of the shaft 13. This sealing face is extremely smooth and is ground within very close tolerances having a suggested surface smoothness or flat ground or lapped to light band specification. The sealing face 42 comprises a section or portion 42a that may be ground to two light band specifications and a portion 42b that may be ground to five light band specifications, the surface 42b being at a slight inward annular tapered relation with respect to the portion 42a.

A complemental sealing ring 43 of the seal unit 40 is somewhat identical to but a mirror image of the sealing ring 39 and comprises an annular element about the shaft extension 21. The ring 43 has a radially extending inwardly directed surface or sealing face 44 of light band specifications for complemental engagement with the sealing face 42 and similarly has a flat portion 44a ground or lapped flat to within a suggested two light band specification. The flat portions 42a and 44a press in flush contact with one another with their interface of engagement in the reference plane P. The ring 43 has a radially extending outwardly diverging portion 44b and forms with portion 42b a V-shape opening 45a. Both of the sealing rings 39 and 43 have inwardly radially projecting lug portions 46' and 47 respectfully defining a groove 48 therebetween. The sealing ring 43 has a backing surface 45 assimilating the backing surface 41 of the sealing ring 39 and cradles a resilient or deformable tubular ring 46 having an annular portion 46a and an aperture 46b, the pressure ring 46 being identical to the pressure ring 38. The pressure ring 46 on its outwardly directed side engages the radially diagonally extending concave inwardly directed surface 49 of the track roller shaft bracket 30, the surface 49 at its inwardly directed end forming a portion of the hood member 32 and assimilating the configuration of the outwardly directed concave surface 37 of the retainer plate 25. An additional sealing ring 50 surrounds the outward end of the shaft portion 21 snugly between the shaft portion 21 and the inner periphery portion 51 of the bracket 30 to prevent entrance of foreign particles between the bracket 30 and the shaft portion 21.

The sealing unit 40 is held in its position in cavity 20 by the assembly of the roller 10a and the shaft 13 on the track frame by track frame bolts 36, flange shaft extension 37', bolt 26, and key 35 under a high compressed loading so as to permit deflection of the pressure rings 38, 46 by the retainer plate 25 and bracket 30 and their respective associated rigid sealing rings 39 and 43 deforming the tubular rings 38 and 46 from a round to an elliptical shape. Because of the contour of the generally radially extending faces 37 and 49 of the plate 25 and bracket 30 respectively and the contour of the generally radially extending backing faces 41, 45 of sealing ring 39 and sealing ring 43, the compressed loading is directed axially to permit flush engagement of the sealing faces 42a and 44a and the relative rotation occurs between the sealing portions 42a and 44a. The sealing faces 42 and 44 are of extremely hard material, but as they slowly wear away due to rotational frictional engagement of portions 42a and 44a, more and more the surfaces 42b and 44b come in contact with one another. The seal rings 39 and 43 may be made of such material as "Stellite" which may be composed generally of the following constituents (expressed in percent by weight).

| | Percent, approx. |
|---|---|
| Iron | 55 |
| Carbon | 3 |
| Chromium | 17 |
| Molybdenum | 16 |
| Cobalt | 6¼ |
| Vanadium | 2 |

It will be noted that the axial loading against the pressure rings 38, 46 extends about the annular periphery of surfaces 41 and 45 of their respective sealing rings 39 and 43. Radial shifting of the pressure rings 38 and 46 are prevented by their conformation to their respective backing faces 41, 45 of their respective sealing rings 39, 43 and to the surfaces 37, 49.

The pressure rings 38 and 46 may have their annular bore or chambers 38b and 46b either under atmospheric pressure or they can be pre-pressurized prior to installation beyond atmospheric pressure to insure tight fitting engagement with the sealing rings 39 and 43 when installed in and compressed by the roller unit 10 to develop a closer and more intimate contact for the sealing faces 42a, 44a.

Thus is can be seen by the applicants' sealing arrangement employing a pair of tubular pressed rings, equalized pressure may be applied about the entire annular extent of the backing faces 41, 45 of the sealing rings 39, 43 to insure equal and flat and flush engagement of the sealing surfaces or faces 42a, 44a and therefore insure against any leakage of oil or foreign particles past the seal unit 40. Also the applicants' device, through distortion of the rubber rings 38 and 46 by axial loading, permits the seal unit 40 to occupy a smaller confined space, which is a desirable feature of this track roller unit 10 and yet permits a minimum of axial displacement of the shaft 13 with respect to the roller element 10a.

By careful formation or production of the contour of the backing faces 41, 45 the spring action of pressure rings 38 and 46 may be controlled. In this respect it will be noted that the backing faces 41, 45 have their surface extent disposed generally radially of the axis of the shaft 13 and that the application of force is therefore in a longitudinal direction generally perpendicular to the radial surface to compress the pressure rings 38 and 46.

The combination of a pair of tubular pressure rings permits more latitude for side movement and allows more resiliency between and lateral displacement of the shaft 13 with respect to the roller 10a and the pressure applied to the sealing faces 42a, 44a is more constant and more equal. Furthermore, since the pressure rings 38, 46 are identical to one another and the sealing rings 39, 43 are mirror images of one another there may be interchangeability between the pressure rings and between the sealing rings. It is important to apply pressure evenly directly in line with the sealing faces all the way around the shaft so as to not distort the sealing faces and this is best accomplished by the employment of a pair of tubular pressure rings.

It will be appreciated that this type of seal structure may be employed for use in other construction besides track roller frames such as the rear drive sprocket of a crawler tractor or the like, or in any instances where there is a relative rotation between parts.

A single preferred embodiment of the invention has been herein shown and described with view of illustrating the principles of and the method of practicing the invention.

What is claimed is:

1. Face sealing structure between rotor and stator parts comprising, in combination with said parts:

a free-floating pair of symmetrical seal ring parts of hard material having relatively rotatable, radially extending end surfaces which engage in the plane of the surfaces in face seal contact with one another, and having concave backing faces;

each of said rotor and stator parts having a concave face opposing a respective backing face and together presenting generally longitudinally acting, longitudinally opposing, concave pressure surfaces; and a pair of symmetrical, hollow, pressure O-rings of elastomeric material sealed between and compressed by the opposing concave pressure surfaces of said parts to float the pair of seal ring parts, said O-rings nesting in the concave backing faces and being compressed into an elliptical, hollow shape wherein, as viewed in cross section, the respective O-rings include major axes, which axes when extended intersecting approximately in the plane of said seal-ring-part surfaces at a point radially outwardly of said surfaces, and which axes at their intersection forming an acute, inwardly facing angle.

2. The invention of claim 1, wherein said O-rings are of a normal circular cross section and have the hollow interior thereof each one pre-pressurized to a super-atmospheric pressure similar to the pressure of the other, whereby to balance the opposed sealing forces on the floating ring parts.

3. Face-sealing structure between a shaft and a housing, said housing being axially recessed at an end adjacent a portion of said shaft, and said shaft portion extending through and beyond the corresponding end of the housing, said structure comprising:

a free-floating pair of symmetrical seal rings having relatively rotatable, radially extending end surfaces which engage in the plane of the surfaces in face seal contact with one another, and having concave backing faces;

a rotor flange fitting against a surface of the recess of said housing;

a stator flange drivingly connected to said shaft, each of said rotor and stator flanges having a concave face opposing a respective backing face and together presenting generally longitudinally acting, longitudinally opposing, concave pressure surfaces;

a pair of symmetrical, hollow, pressure O-rings of elastomeric material sealed between and compressed by the opposing concave pressure surfaces of the flanges and seal rings to float the pair of seal rings, said O-rings nesting in the concave backing faces and being compressed into an elliptical, hollow shape wherein, as viewed in cross section, the respective O-rings include major axes, which axes when extended intersecting approximately in the plane of said seal-ring-part surfaces at a point radially outwardly of said surfaces, and which axes at their intersection forming an acute inwardly facing angle;

a stator seal between the stator flange and said shaft; and a rotor seal between the rotor flange and said housing.

4. The invention of claim 3, said structure further comprising axial hood projections carried by the respective flanges in closely spaced apart confronting relation; and a hood member carried by the stator flange and extending radially outwardly from a point proximate to the adjacent axial hood projection, said rotor and stator seals and said hood projections cooperating with the seal rings and O-rings to block foreign matter.

References Cited in the file of this patent

UNITED STATES PATENTS

| | | |
|---|---|---|
| 2,989,966 | Marshall | June 27, 1961 |
| 3,073,657 | Oxford | Jan. 15, 1963 |
| 3,086,782 | Peickii et al. | Apr. 23, 1963 |

FOREIGN PATENTS

| | | |
|---|---|---|
| 265,615 | Switzerland | Sept. 16, 1950 |
| 1,255,283 | France | Jan. 23, 1961 |
| 1,101,071 | Germany | Mar. 2, 1961 |